US006956000B2

United States Patent
Komori et al.

(10) Patent No.: US 6,956,000 B2
(45) Date of Patent: *Oct. 18, 2005

(54) PANEL GLASS FOR CATHODE RAY TUBE

(75) Inventors: Hiroshi Komori, Otsu (JP); Hiroki Yamazaki, Koga-gun (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/277,883

(22) Filed: Oct. 23, 2002

(65) Prior Publication Data

US 2003/0087744 A1 May 8, 2003

(30) Foreign Application Priority Data

Oct. 30, 2001 (JP) ................................. P2001-333147

(51) Int. Cl.$^7$ ........................... C03C 3/085; C03C 3/078
(52) U.S. Cl. ............................. 501/69; 501/72; 501/64; 501/70
(58) Field of Search ..................... 501/64–72; 313/480, 313/477 B

(56) References Cited

U.S. PATENT DOCUMENTS

| | | | | | |
|---|---|---|---|---|---|
| 3,819,972 | A | * | 6/1974 | Sanner | 313/480 |
| 4,065,697 | A | * | 12/1977 | Steierman | 313/480 |
| 5,631,195 | A | * | 5/1997 | Yanagisawa et al. | 501/72 |
| 6,097,144 | A | * | 8/2000 | Lehman | 313/461 |
| 2003/0076027 | A1 | * | 4/2003 | Kuroki et al. | 313/477 R |
| 2003/0085647 | A1 | * | 5/2003 | Komori et al. | 313/477 R |

FOREIGN PATENT DOCUMENTS

| | | | | |
|---|---|---|---|---|
| JP | 58-84142 | | 5/1983 | |
| JP | 58084142 A | * | 5/1983 | ............. C03C/3/04 |
| JP | 63215533 A | * | 9/1988 | ........... C03C/3/095 |
| JP | 3-12337 | | 1/1991 | |
| JP | 4-31335 | | 2/1992 | |
| JP | 2001302276 A | * | 10/2001 | ........... C03C/3/093 |
| JP | 2001-302277 | | 10/2001 | |
| JP | 2003119050 A | * | 4/2003 | ............. C03C/4/08 |

OTHER PUBLICATIONS

Derwent Abstract 1991–062630, English Abstract of JP 03–012337 A.*
Derwent Abstract 1988–295839, English Abstract of JP 63–215533 A.*
Derwent Abstract 1983–62210K, English Abstract of JP 58–084142 A.*
Derwent Abstract 2003–425039, English Abstract of JP 2003–119050 A.*
Derwent Abstract 2002–319417, English Abstract of JP 2002–319417 A.*
Machine Translation of JP 2002–319417 A.*

* cited by examiner

Primary Examiner—Karl Group
Assistant Examiner—Elizabeth A. Bolden
(74) Attorney, Agent, or Firm—Nixon & Vanderhye P.C.

(57) ABSTRACT

Panel glass, for a cathode ray tube, which has an SrO/(SrO+BaO) ratio of from 0.35 to 0.70, an X-ray absorption coefficient of 36.0 cm$^{-1}$ or more at the wavelength of 0.6 angstrom, wherein $Na_2O/R_2O$, $K_2O/R_2O$ and $Li_2O/R_2O$ ($R_2O$: $Na_2O+K_2O+Li_2O$) molar ratios fall within a range surrounded by the points A (0, 0.2, 0.8), B (0.2, 0.2, 0.6), C (0.4, 0.6, 0), D (0.2, 0.8, 0) and E (0, 0.4, 0.6) in the ternary phase diagram as shown in FIG. 1.

1 Claim, 1 Drawing Sheet

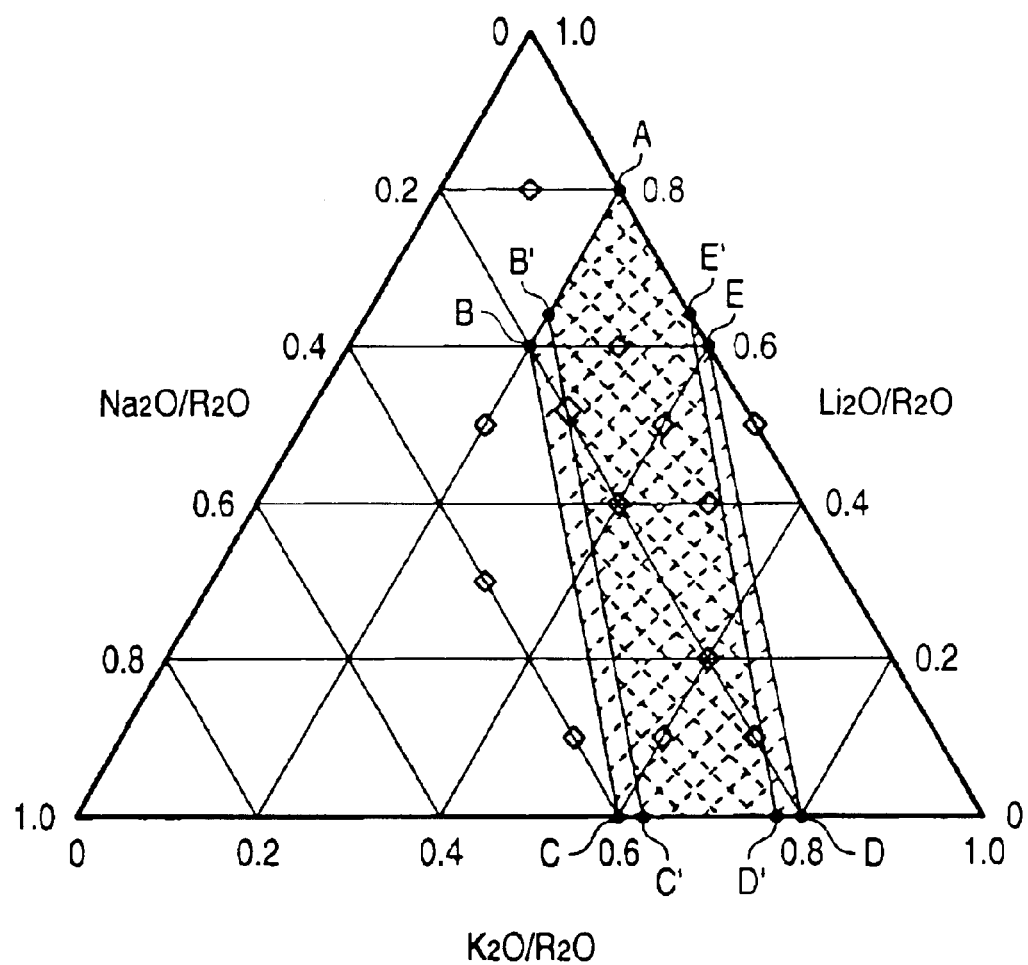
FIGURE

PANEL GLASS FOR CATHODE RAY TUBE

FIELD OF THE INVENTION

The present invention relates to panel glass for a cathode ray tube for use in a color television tube, a projector tube, etc.

BACKGROUND OF THE INVENTION

An envelope of a cathode ray tube comprises a panel portion onto which an image is projected, a neck portion on which an electron gun is mounted and a funnel-shaped funnel portion which connects the panel portion and the neck portion to each other. The electron ray emitted by the electron gun hits a fluorescent material provided on the inner surface of the panel portion to allow the fluorescent material to emit light so that an image is projected onto the panel portion. During this process, damping X-rays are produced in the tube. When these damping X-rays leak out of the tube through the envelope, they have adverse effects on the human body. Thus, this kind of an envelope has been required to have a high X-ray absorbing power.

In order to enhance the X-ray absorption coefficient of glass, glass may include PbO. However, the use of PbO-containing glass as panel glass is disadvantageous in that electron rays emitted when an image is projected cause coloring called browning, making the image less viewable.

In order to inhibit browning, it has been practiced to use glass containing SrO or BaO, which exhibits a high X-ray absorption coefficient, rather than PbO, which causes browning, as panel glass.

Recently, higher applied voltage has been used to obtain an image having higher brightness and higher quality. It has thus been desired to provide panel glass with a higher X-ray absorption coefficient.

However, when SrO or BaO is contained in glass, liquid phase temperature of glass is likely to increase. Therefore, when the content of SrO or BaO is increased to thereby obtain a high X-ray absorption coefficient, glass can has easily deposition of devitrification stones due to strontium or barium during forming, and thus forming of the glass becomes difficult. As a result, it has been disadvantageous in that panel glass having a desired X-ray absorption coefficient cannot be produced with a good yield.

Furthermore, when the applied voltage is increased, browning is easily caused in even glass free of PbO.

In recent years, images having two kinds of frame ratios, i.e., 4:3 and 16:9, have been broadcasted. Thus, the panel portion has an area where an image is always projected and an area where an image is not projected depending on the frame ratio. Accordingly, periods of time for irradiation with electron rays are different in the two areas. As a result, amounts of browning are different in the two areas. In particular, it is difficult to obtain images on the border of the two areas.

SUMMARY OF THE INVENTION

An objective of the present invention is to provide panel glass for a cathode ray tube which is little subjected to browning and can produce few devitrification stones during forming even if it includes a large amount of SrO or BaO in order to enhance its X-ray absorption coefficient.

As a result of intensive investigations, the present inventors found that the adjustment of SrO/(SrO+BaO) value makes it possible to lower the liquid phase temperature and hence enhance X-ray absorption coefficient without producing devitrification stones during forming and the adjustment of the ratio of alkaline components makes it more difficult for browning to occur. Thus, the present invention has been completed.

This and other objects of the present invention have been accomplished by panel glass, for a cathode ray tube, comprising:

$SiO_2$ in an amount of from 45% to 60% by weight;
$Al_2O_3$ in an amount of from 0% to 1.2% by weight;
MgO in an amount of from 0% to 3% by weight;
CaO in an amount of from 0% to 3% by weight;
SrO in an amount of from 7% to 15% by weight;
BaO in an amount of from 6% to 14.5% by weight;
ZnO in an amount of from 5% to 10% by weight;
$Na_2O$ in an amount of from 0.01% to 4% by weight;
$K_2O$ in an amount of from 6% to 15% by weight;
$Li_2O$ in an amount of from 0.01% to 4% by weight;
$ZrO_2$ in an amount of from 0% to 1.5% by weight;
$TiO_2$ in an amount of from 0% to 3% by weight;
$CeO_2$ in an amount of from 0% to 3% by weight;
$Sb_2O_3$ in an amount of from 0% to 2% by weight; and
wherein SrO/(SrO+BaO) ratio by weight is from 0.35 to 0.70;
wherein the glass is substantially free of PbO,
wherein the glass has an X-ray absorption coefficient of 36.0 $cm^{-1}$ or more at the wavelength of 0.6 angstrom, and
wherein $Na_2O/R_2O$, $K_2O/R_2O$ and $Li_2O/R_2O$ ($R_2O$: $Na_2O+K_2O+Li_2O$) molar ratios fall within a range surrounded by the points A (0, 0.2, 0.8), B (0.2, 0.2, 0.6), C (0.4, 0.6, 0), D (0.2, 0.8, 0) and E (0, 0.4, 0.6) in the ternary phase diagram shown in FIG. 1.

BRIEF DESCRIPTION OF THE DRAWINGS

FIG. 1 shows the alkaline metal component (molar ratio) in glass in the form of ternary phase diagram. The 13 points marked by "◇" correlate with the 15 Example Nos. in Tables 1 to 4 (Nos. 2 and 9 fall at the same position as do Nos. 4 and 10).

DETAILED DESCRIPTION OF THE INVENTION

Unless otherwise indicated, the term "%" hereinafter means "% by weight" based on the total amount of glass. The expression "X is contained in an amount of from 0 to Y%" means that X is either not present, or is higher than 0% and Y % or lower.

Panel glass, for a cathode ray tube, according to the present invention is substantially free of PbO. Specifically, the content of PbO is 5000 ppm or less, preferably 1000 ppm of less, and still more preferably 500 ppm or less, based on the total amount of glass.

Since panel glass for a cathode ray tube of the present invention contains SrO and BaO in an amount of from 7% to 15% and from 6% to 14.5%, respectively, wherein SrO/(SrO+BaO) ratio is from 0.35 to 0.70, despite being of free of PbO, which causes browning, the liquidus temperature of glass can be lowered. Therefore, it is possible to predetermine an X-ray absorption coefficient to be 36.0 $cm^{-1}$ or more at the wavelength of 0.6 angstrom without producing devitrification stones during forming.

In general, browning occurs when electron rays are irradiated with ions constituting glass, and ions are reduced to thereby produce metallic colloid. In panel glass for a cathode ray tube free of PbO, browning is caused because the alkaline metal ions constituting glass are reduced to alkaline metals. Thus, the panel glass for a cathode ray tube of the present invention is arranged such that the $Na_2O/R_2O$, $K_2O/R_2O$ and $Li_2O/R_2O$ molar ratios fall within a range surrounded by the points A (0, 0.2, 0.8), B (0.2, 0.2, 0.6), C (0.4, 0.6, 0), D (0.2, 0.8, 0) and E (0, 0.4, 0.6) in the attached ternary phase diagram to thereby prevent alkaline metal ions from forming a colloid, making it possible to inhibit browning.

The reason why the composition of glass in the present invention is defined as mentioned above will be described hereinafter.

PbO is a component which enhances X-ray absorbing power of glass. However, when glass contains PbO, browning is caused upon irradiation with electron rays and X rays. Thus, PbO should not be incorporated in glass of the present invention.

$SiO_2$ is a component which acts as a glass network former. The content of $SiO_2$ is from 45% to 60%, preferably from 50% to 58%. When the content of $SiO_2$ is 45% or more, the resulting glass maintains a viscosity to be formed. On the other hand, when the content of $SiO_2$ is 60% or less, the resulting glass maintains a thermal expansion coefficient and it conforms to the expansion coefficient of funnel glass.

$Al_2O_3$ is also a component which acts as a glass network former. The content of $Al_2O_3$ is from 0% to 1.2%, preferably 1.0% or less. When the content of $Al_2O_3$ is 1.2% or less, $Al_2O_3$ does not react with the refractory material so that reaction stones such as leucite and orthoclase which lower the productivity is not produced.

MgO and CaO are components which make it easy for glass to melt and adjusts the thermal expansion coefficient and viscosity. The contents of MgO and CaO are each from 0% to 3%, preferably 2% or less. When the contents of MgO and CaO are each 3% or less, the resulting glass is hard to be devitrified and does not exhibit a raised liquidus temperature that makes it difficult for itself to be formed.

SrO is a component which makes it easy for glass to melt and adjusts the thermal expansion coefficient and viscosity to remarkably enhance X-ray absorbing power. The content of SrO is from 7% to 15%, preferably from 7.5% to 14%. When the content of SrO is 15% or less, the resulting glass is hard to be devitrified and does not exhibit a raised liquidus temperature that makes it difficult for itself to be formed. On the other hand, when the content of SrO is 7% or more, a sufficient X-ray absorbing power can be obtained.

Similarly to SrO, BaO is a component which makes it easy for glass to melt and adjusts the thermal expansion coefficient and viscosity to remarkably enhance X-ray absorbing power. The content of BaO is from 6% to 14.5%, preferably from 7% to 14%. When the content of BaO is 14.5% or less, the resulting glass is hard to be devitrified and does not exhibit a raised liquidus temperature that makes it difficult for itself to be formed. On the other hand, when the content of BaO is 6% or more, a sufficient X-ray absorbing power can be obtained.

Similarly to SrO and BaO, ZnO is a component which makes it easy for glass to melt and adjusts the thermal expansion coefficient and viscosity to remarkably enhance X-ray absorbing power. The content of ZnO is from 5% to 10%, preferably from 6% to 10%. When the content of ZnO is 10% or less, the resulting glass is hard to be devitrified and does not exhibit a raised liquidus temperature that makes it difficult for itself to be formed. On the other hand, when the content of ZnO is 5% or more, a sufficient X-ray absorbing power can be obtained.

$Na_2O$ is a component which adjusts the thermal expansion coefficient and viscosity. The content of $Na_2O$ is from 0.01% to 4%, preferably from 0.01% to 3.8%. When the content of $Na_2O$ is 4% or less, the resulting glass maintains a viscosity to be formed and an electrical insulation. On the other hand, when the content of $Na_2O$ is 0.01% or more, the resulting glass maintains a thermal expansion coefficient and it conforms to the expansion coefficient of funnel glass.

Similarly to $Na_2O$, $K_2O$ is a component which adjusts the thermal expansion coefficient and viscosity. The content of $K_2O$ is from 6% to 15%, preferably from 6.2% to 14.5%. When the content of $K_2O$ is 6% or more, the resulting glass maintains a thermal expansion coefficient. On the other hand, when the content of $K_2O$ is 15% or less, the resulting glass maintains an electrical insulation.

Similarly to $Na_2O$ and $K_2O$, $Li_2O$ is a component which adjusts the thermal expansion coefficient and viscosity. The content of $Li_2O$ is from 0.01% to 4.0%, preferably from 0.3% to 4.0%. When the content of $Li_2O$ is 0.01% or more, the resulting glass maintains a thermal expansion coefficient. On the other hand, when the content of $Li_2O$ is 4.0% or less, the resulting glass maintains an electrical insulation.

$ZrO_2$ is a component which adjusts the thermal expansion coefficient and viscosity and enhances X-ray absorbing power. The content of $ZrO_2$ is from 0% to 1.5%, preferably from 0.1% to 1.4%. When the content of $ZrO_2$ is 1.5% or less, the resulting glass is hard to be devitrified and makes it easy for itself to be formed.

$TiO_2$ is a component which inhibits the coloring of glass with ultraviolet rays. The content of $TiO_2$ is from 0% to 3%, preferably from 0.1% to 2%. When the content of $TiO_2$ is 3% or less, its effect can be remarkably enhanced, and a material cost can be reduced.

$CeO_2$ is a component which inhibits coloring of glass with X-ray. The content of $CeO_2$ is from 0% to 3%, preferably from 0.1% to 2%. When the content of $CeO_2$ is 3% or less, the resulting glass is not colored, making it possible to obtain a sufficient light transmittance.

$Sb_2O_3$ can be used as a clarifier. The content of $Sb_2O_3$ is from 0% to 2%, preferably 1% or less. When the content $Sb_2O_3$ is 2% or less, its effect can be remarkably enhanced, and a material cost can be reduced.

In order to lower the liquidus temperature of glass and predetermine the X-ray absorption coefficient to be 36.0 $cm^{-1}$ or more at a wavelength of 0.6 angstrom without producing devitrification stones during formation, it is necessary that SrO/(SrO+BaO) ratio be from 0.35 to 0.70 when the content of SrO and BaO are 7% or more and 6% or more, respectively. The SrO/(SrO+BaO) ratio is preferably from 0.37 to 0.65.

When SrO/(SrO+BaO) ratio by weight is 0.35 or more, barium disilicate does not separate out and the resulting glass is hard to be devitrified and does not exhibit a raised liquidus temperature. Moreover, the resulting SrO, which has a high X-ray absorption coefficient, causes X-ray absorption coefficient at a wavelength of 0.6 angstrom to 36.0 $cm^{-1}$ or more.

On the other hand, when SrO/(SrO+BaO) ratio by weight is 0.70 or less, strontium silicate does not separate out and the resulting glass is hard to be devitrified and does not exhibit a raised liquidus temperature.

In order to further prevent browning of glass free of PbO, it is necessary that $Na_2O/R_2O$, $K_2O/R_2O$ and $Li_2O/R_2O$ molar ratios fall within a range surrounded by the points A (0, 0.2, 0.8), B (0.2, 0.2, 0.6), C (0.4, 0.6, 0), D (0.2, 0.8, 0) and E (0, 0.4, 0.6) in the attached ternary phase diagram shown in FIG. 1. When these molar ratios fall inside the range surrounded by the points A to E, the alkaline metal ions are hard to form a colloid and a browning is not raised when irradiated with electron rays. The preferred range is surrounded by the point A (0, 0.2, 0.8), the point B' (0.15, 0.20, 0.65), the point C' (0.375, 0.625, 0), the point D' (0.225, 0.775, 0) and the point E' (0, 0.35, 0.65).

Panel glass for a cathode ray tube of the invention will be further described in the following examples.

As mentioned above, the glass of the present invention exhibits a high browning resistance and an X-ray absorption coefficient of 36.0 cm$^{-1}$ or more. Furthermore, the glass of the present invention exhibits a low liquidus temperature and thus can be easily molt-formed. Thus, the glass of the present invention is preferably useful as panel glass for a cathode ray tube.

Tables 1 and 2 each show the data of the examples (Sample Nos. 1 to 8) and Tables 3 and 4 each show comparative examples (Sample Nos. 9 to 15).

TABLE 1

| | Example Nos. | | | |
|---|---|---|---|---|
| | 1 | 2 | 3 | 4 |
| Composition (% by weight) | | | | |
| $SiO_2$ | 57.9 | 57.8 | 55.1 | 56.1 |
| $Al_2O_3$ | 0.3 | 1.2 | 1.0 | 0.3 |
| MgO | — | 0.2 | 1.0 | — |
| CaO | — | 0.2 | 1.0 | 0.2 |
| SrO | 8.0 | 11.0 | 12.0 | 10.0 |
| BaO | 13.0 | 10.0 | 7.0 | 9.0 |
| ZnO | 7.0 | 6.0 | 9.0 | 6.0 |
| $Na_2O$ | 1.4 | 1.3 | 1.3 | 3.3 |
| $K_2O$ | 6.2 | 7.7 | 9.9 | 10.0 |
| $Li_2O$ | 4.0 | 3.1 | 2.5 | 3.2 |
| $ZrO_2$ | 1.3 | 0.2 | — | 1.0 |
| $TiO_2$ | 0.3 | 0.1 | 0.1 | 0.5 |
| $CeO_2$ | 0.5 | 1.0 | 0.1 | 0.1 |
| $Sb_2O_3$ | 0.1 | 0.2 | — | 0.3 |
| SrO/(SrO + BaO) | 0.38 | 0.52 | 0.63 | 0.53 |
| $Na_2O/R_2O$ (molar ratio) | 0.1 | 0.1 | 0.1 | 0.2 |
| $K_2O/R_2O$ (molar ratio) | 0.3 | 0.4 | 0.5 | 0.4 |
| $Li_2O/R_2O$ (molar ratio) | 0.6 | 0.5 | 0.4 | 0.4 |
| X-ray absorption coefficient (0.6 angstrom, cm$^{-1}$) | 37 | 37 | 39 | 37 |
| Browning ΔT % | 5 | 5 | 3 | 5 |
| Liquidus temperature (° C.) | 850 | 925 | 945 | 905 |

TABLE 2

| | Example Nos. | | | |
|---|---|---|---|---|
| | 5 | 6 | 7 | 8 |
| Composition (% by weight) | | | | |
| $SiO_2$ | 54.5 | 51.4 | 50.1 | 56.3 |
| $Al_2O_3$ | 0.5 | 0.7 | 0.9 | 0.1 |
| MgO | 0.5 | — | 0.1 | — |
| CaO | — | — | 0.1 | — |
| SrO | 9.5 | 8.0 | 9.0 | 9.0 |
| BaO | 9.5 | 12.5 | 11.0 | 9.0 |
| ZnO | 7.0 | 7.8 | 8.5 | 10.0 |
| $Na_2O$ | 3.1 | 3.0 | 2.7 | 3.5 |
| $K_2O$ | 11.8 | 13.3 | 14.4 | 10.8 |
| $Li_2O$ | 2.2 | 1.4 | 0.7 | 0.6 |
| $ZrO_2$ | 0.5 | 1.0 | 1.4 | 0.2 |
| $TiO_2$ | 0.1 | 0.4 | 0.5 | 0.2 |
| $CeO_2$ | 0.5 | 0.4 | 0.5 | 0.2 |
| $Sb_2O_3$ | 0.3 | 0.1 | 0.1 | 0.1 |
| SrO/(SrO + BaO) | 0.50 | 0.39 | 0.45 | 0.50 |
| $Na_2O/R_2O$ (molar ratio) | 0.2 | 0.2 | 0.2 | 0.3 |
| $K_2O/R_2O$ (molar ratio) | 0.5 | 0.6 | 0.7 | 0.6 |
| $Li_2O/R_2O$ (molar ratio) | 0.3 | 0.2 | 0.1 | 0.1 |
| X-ray absorption coefficient (0.6 angstrom, cm$^{-1}$) | 36 | 38 | 40 | 37 |
| Browning ΔT % | 5 | 4 | 4 | 5 |
| Liguidus temperature (° C.) | 895 | 855 | 880 | 890 |

TABLE 3

| | Comparative Example Nos. | | | |
|---|---|---|---|---|
| | 9 | 10 | 11 | 12 |
| Composition (% by weight) | | | | |
| $SiO_2$ | 56.3 | 54.7 | 57.3 | 55.6 |
| $Al_2O_3$ | 1.0 | 1.0 | 0.5 | 0.5 |
| MgO | 0.5 | 2.0 | — | — |
| CaO | 0.5 | — | 1.5 | — |
| SrO | 7.0 | 14.5 | 11.0 | 9.0 |
| BaO | 13.5 | 6.0 | 8.0 | 12.0 |
| ZnO | 7.0 | 7.0 | 9.0 | 7.0 |
| $Na_2O$ | 1.3 | 1.3 | — | 5.0 |
| $K_2O$ | 7.7 | 9.9 | 9.3 | 5.0 |
| $Li_2O$ | 3.1 | 2.5 | 3.0 | 4.0 |
| $ZrO_2$ | 1.2 | 0.5 | 1.0 | 1.2 |
| $TiO_2$ | 0.5 | 0.5 | 0.2 | 0.6 |
| $CeO_2$ | 0.3 | — | 0.2 | 0.1 |
| $Sb_2O_3$ | 0.1 | 0.1 | — | — |
| SrO/(SrO + BaO) | 0.34 | 0.71 | 0.58 | 0.43 |
| $Na_2O/R_2O$ (molar ratio) | 0.1 | 0.2 | 0 | 0.3 |
| $K_2O/R_2O$ (molar ratio) | 0.4 | 0.4 | 0.5 | 0.2 |
| $Li_2O/R_2O$ (molar ratio) | 0.5 | 0.4 | 0.5 | 0.5 |
| X-ray absorption coefficient (0.6 angstrom, cm$^{-1}$) | 35 | 41 | 39 | 37 |
| Browning ΔT % | 5 | 3 | 9 | 11 |
| Liquidus temperature (° C.) | 870 | 970 | 910 | 885 |

TABLE 4

| | Comparative Example Nos. | | |
|---|---|---|---|
| | 13 | 14 | 15 |
| Composition (% by weight) | | | |
| $SiO_2$ | 57.4 | 51.6 | 56.4 |
| $Al_2O_3$ | 1.0 | — | 0.1 |
| MgO | — | — | — |
| CaO | — | — | — |
| SrO | 11.0 | 9.5 | 13.0 |
| BaO | 12.0 | 12.0 | 9.0 |
| ZnO | 6.0 | 8.0 | 7.5 |
| $Na_2O$ | 1.8 | 3.0 | 4.0 |
| $K_2O$ | 2.7 | 13.3 | 7.7 |
| $Li_2O$ | 7.0 | 1.4 | 0.5 |
| $ZrO_2$ | — | 1.0 | 1.3 |
| $TiO_2$ | 0.1 | 0.4 | 0.1 |
| $CeO_2$ | 0.5 | 0.4 | 0.1 |

TABLE 4-continued

|  | Comparative Example Nos. | | |
| --- | --- | --- | --- |
|  | 13 | 14 | 15 |
| Sb$_2$O$_3$ | 0.5 | 0.1 | 0.3 |
| SrO/(SrO + BaO) | 0.48 | 0.44 | 0.59 |
| Na$_2$O/R$_2$O (molar ratio) | 0.1 | 0.4 | 0.4 |
| K$_2$O/R$_2$O (molar ratio) | 0.1 | 0.3 | 0.5 |
| Li$_2$O/R$_2$O (molar ratio) | 0.8 | 0.3 | 0.1 |
| X-ray absorption coefficient (0.6 angstrom, cm$^{-1}$) | 37 | 38 | 39 |
| Browning ΔT % | 13 | 10 | 10 |
| Liquidus temperature (° C.) | 935 | 910 | 945 |

The various samples in these tables were prepared in the following manner.

A starting material batch which had been prepared so as to have the glass composition as set forth in these tables was put in a platinum crucible and then the mixture is melted at a temperature of about 1,500° C. for 4 hours. In order to obtain a homogeneous glass composition, the mixture was stirred with a platinum stirring rod for 3 minutes for defoaming. Thereafter, the molten glass was formed into a predetermined shape, and then allowed to cool.

The various samples thus obtained were each then measured for X-ray absorption coefficient, browning and liquid phase temperature. The measurements are set forth in the tables above.

For the determination of X-ray absorption coefficient, the absorption coefficient with respect to wavelength of 0.6 angstrom was calculated on the basis of glass composition and density.

For the measurement of browning, the various samples were each subjected to polishing on both sides thereof to a thickness of 2 mm. These samples were each measured for light transmittance at a wavelength of 400 nm. Subsequently, these samples were each irradiated with electron ray having a power of 30 kV and a dose of 3 μA/cm$^2$ for 48 hours. Thereafter, these samples were each measured for light transmittance at a wavelength of 400 nm. Thus, the drop of light transmittance by irradiation with electron ray was determined and represented by ΔT %. The more this light transmittance drop is, the more easily can occur browning and the worse is the browning resistance.

The measurement of a liquidus temperature was conducted in the following manner. The various samples were each ground to a size of from 300 μm to 500 μm, and then stirred. These samples were each put in a platinum boat which was then moved to a furnace having a temperature gradient of from 750° C. to 1,050° C., and then it was kept for 48 hours. The platinum boat was then withdrawn from the temperature gradient furnace. Thereafter, the glass composition was withdrawn from the platinum boat. The samples thus obtained were each then observed under polarization microscope to measure the deposition point of crystals.

As can be seen in the tables above, Sample Nos. 1 to 8 as the examples each include SrO and BaO in an amount of from 7% to 15% and from 6% to 14.5%, respectively, wherein SrO/(SrO+BaO) ratio is from 0.35 to 0.70 and thus exhibit an X-ray absorption coefficient of not smaller than 36 cm$^{-1}$ and a liquidus temperature as low as not higher than 945° C. Furthermore, since the molar ratio of alkaline metal components falls within the range surrounded by the points A to E in the ternary phase diagram of FIG. 1, Sample Nos. 1 to 8 have a small browning amount of 5 or less.

On the other hand, Sample No. 9, as the comparative example, has an SrO/(SrO+BaO) ratio of 0.34 and thus exhibits an X-ray absorption coefficient as low as 35 cm$^{-1}$. Sample No. 10 as the comparative example has an SrO/(SrO+BaO) ratio of 0.71 and thus exhibits a liquidus temperature as high as 970° C. Sample Nos. 11 to 15 each have an alkaline metal component molar ratio falling outside the range surrounded by the points A to E in the ternary phase diagram of FIG. 1 and thus have a large browning amount of 9 or more.

While the invention has been described in detail and with reference to specific embodiments thereof, it will be apparent to one skilled in the art that various changes and modifications can be made therein without departing from the spirit and scope thereof.

This application is based on Japanese patent application No. 2001-333147 filed on Oct. 30, 2001, the entire content of which is incorporated herein by reference.

What is claimed is:

1. Panel glass, for a cathode ray tube, comprising:

SiO$_2$ in an amount of from 45% to 60% by weight;
Al$_2$O$_3$ in an amount of from 0% to 1.2% by weight;
MgO in an amount of from 0% to 3% by weight;
CaO in an amount of from 0% to 3% by weight;
SrO in an amount of from 7% to 15% by weight;
BaO in an amount of from 6% to 14.5% by weight;
ZnO in an amount of from 5% to 10% by weight;
Na$_2$O in an amount of from 0.01% to 4% by weight;
K$_2$O in an amount of from 6% to 15% by weight;
Li$_2$O in an amount of from 0.01% to 4% by weight;
ZrO$_2$ in an amount of from 0% to 1.5% by weight;
TiO$_2$ in an amount of from 0% to 3% by weight;
CeO$_2$ in an amount of from 0% to 3% by weight;
Sb$_2$O$_3$ in an amount of from 0% to 2% by weight; and
wherein SrO/(SrO+BaO) ratio by weight is from 0.35 to 0.70;
wherein the glass is substantially free of PbO,
wherein the glass has an X-ray absorption coefficient of 36.0 cm$^{-1}$ or more at the wavelength of 0.6 angstrom, and
wherein Na$_2$O/R$_2$O, K$_2$O/R$_2$O and Li$_2$O/R$_2$O (R$_2$O: Na$_2$O+K$_2$O+Li$_2$O) molar ratios fall within a range surrounded by the points A (0, 0.2, 0.8), B (0.2, 0.2, 0.6), C (0.4, 0.6, 0), D (0.2, 0.8, 0) and E (0, 0.4, 0.6) in the ternary phase diagram shown in FIG. 1.

* * * * *